Figure 1:
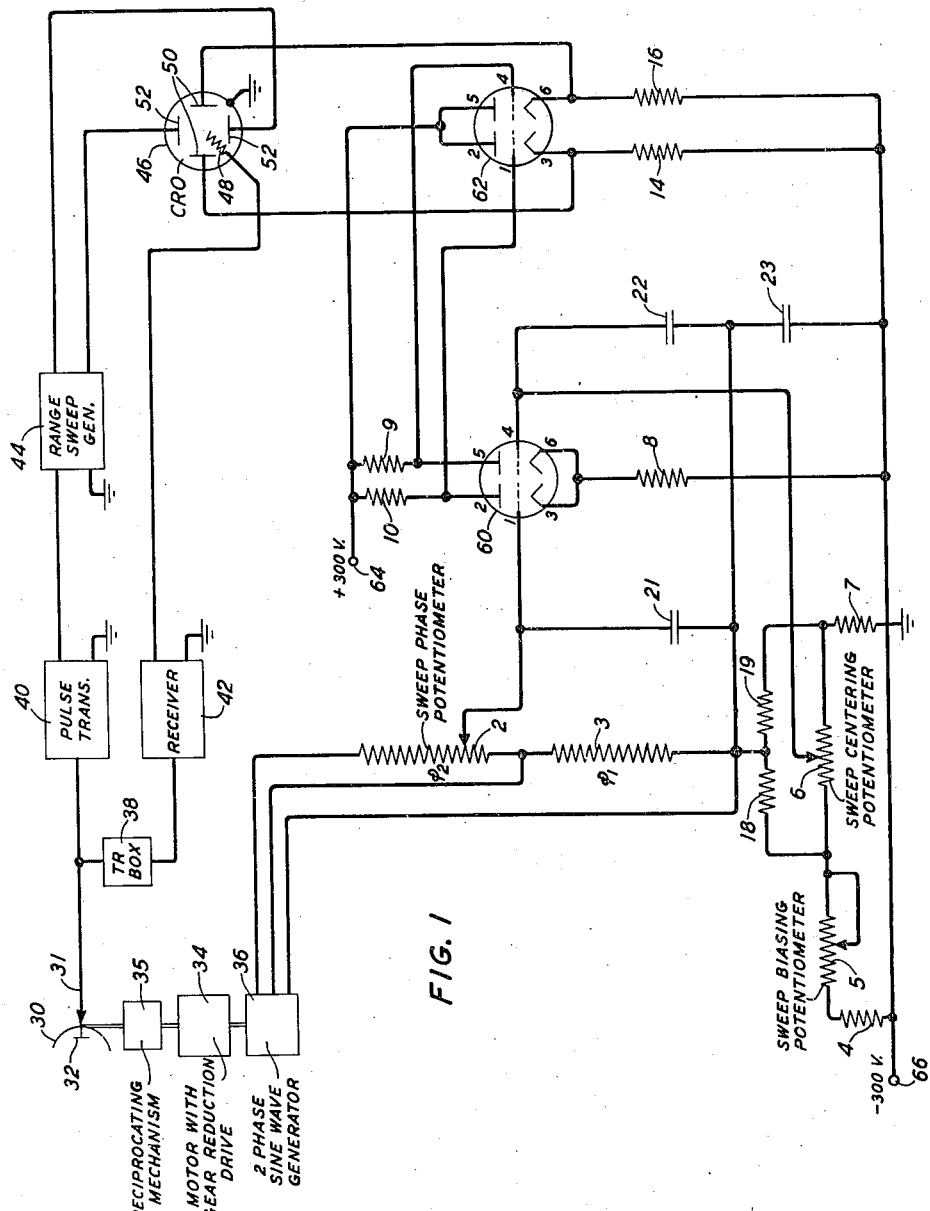

July 19, 1949.  W. H. DOHERTY  2,476,441
BEARING SWEEP AMPLIFIER CIRCUIT
Filed Sept. 26, 1946

INVENTOR
W. H. DOHERTY
BY
H. O. Wright
ATTORNEY

Patented July 19, 1949

2,476,441

UNITED STATES PATENT OFFICE 2,476,441

BEARING SWEEP AMPLIFIER CIRCUIT

William H. Doherty, Summit, N. J., assignor to Bell Telephone Laboratories, Incorporated, New York, N. Y., a corporation of New York Application September 26, 1946, Serial No. 699,453

3 Claims. (Cl. 343—16)

This invention relates to bearing sweep amplifier circuits for radar systems and the like. More particularly it relates to circuits for generating suitable balanced push-pull sweep voltages synchronized with an exploratory element, the phase of which sweep voltages can be conveniently and precisely adjusted to bring the sweep voltages into exact phase-coincidence with the exploratory element.

Circuits of the invention are of particular value in connection with radar systems of the type in which a sector in space is recurrently scanned by a highly directive or beam antenna. The sector scanned usually comprises an angle of from 15 to 30 degrees, though the principles of the invention are readily applicable to any size of scanning angle. The sweep voltages are employed of course in the normal types of radar to deflect the ray of a cathode ray oscilloscope in synchronism with the sweeping motion of the highly directive beam of the antenna. Simultaneously the ray of the oscilloscope is usually deflected in a second direction at right angles to the first mentioned sweep, to portray a second dimension of the field being scanned such, for example, as range, in which case the indication provided is known as a class B presentation.

In radar systems of this general type in the prior art it has been customary, in adjusting the sweep phase to coincide with the antenna bearing, to require a mechanical adjustment of some portion of the bearing indicating apparatus directly associated with the antenna scanning mechanism. The present invention avoids this necessity and substitutes for mechanical adjustment a simple and precise electrical control means which can be located at any convenient point in the radar system. This is a distinct advantage in radar systems employed on aircraft or on shipboard where the antenna system may be mounted in a relatively inaccessible position.

The distinctive feature of the circuits of the invention comprises a balanced electronic sweep circuit controlled by a sine wave input. The sine wave input is derived by combining with one phase of a two-phase sine wave generator, driven by the antenna scanning mechanism, a controllable amount of the second phase of the generator. By this means a precise and convenient control which may be effected at any desired station of the radar system is provided.

A principal object of the invention is therefore to provide a precise and convenient means for controlling the phase of the bearing sweep of a sector-scanning type of radar system.

Another object is to provide a bearing sweep circuit the phase control of which can conveniently be located at a point remote from the antenna system of a sector-scanning type of radar system.

Other and further objects will become apparent during the course of the description hereinunder of a specific illustrative embodiment of the invention and from the appended claims.

The nature of the invention will be more readily understood from the following detailed description of a specific illustrative embodiment of the invention taken with the accompanying drawing in which the figure shows in schematic diagram form a system embodying the principles of the invention.

In more detail in the figure, the combination of reflector 30 and radiating system 32 comprises a highly directive beam antenna system. Reflector 30 is preferably parabolic in form and is a sheet or mesh of conductive material. Radiating system 32 is placed substantially at the focal point of reflector 30 and can be either a simple dipole antenna, or an array of dipole antennas or a wave guide radiating structure arranged to direct energy toward the reflector 30. The reflector, of course, focusses energy emanating from radiator 32 into a highly directive beam. Likewise it focusses received energy, reflected from objects upon which the beam impinges, upon the radiator 32.

As in conventional radar systems, well-known to those skilled in the art, pulse transmitter 40 recurrently energizes radiator 32 with high power short pulses of energy, spaced sufficiently in time to permit the receipt of reflections of each pulse before the emission of the next successive pulse.

TR box 38 functions to protect receiver 42 during the transmission of high power pulses by substantially short-circuiting the input to the receiver during the high power pulses. However, it instantaneously removes the short-circuit upon the cessation of each high power pulse thus conditioning the receiving circuit for the reception of the relatively weak reflections received between successive transmitted pulses. Receiver 42 detects and amplifies the reflected pulses and transmits them to the amplitude control anode 48 of the cathode ray oscilloscope 46 causing a momentary brightening of the ray upon the receipt of each reflected pulse.

Through the medium of a motor equipped with a reduction gear drive 34 and a reciprocating mechanism 35, the antenna system 30, 32 is caused to scan, by way of example, a sector of 15 degrees at a rate of five times per second (double sweep). Lead 31 makes connection through a slip-ring or other appropriate electrical connection, many forms of which are well-known in the art, to radiator 32, thus maintaining the desired connection between radiator 32 and units 38, 40, 42.

The motor, the reduction gear associated therewith and the reciprocating mechanism can be of any of the numerous appropriate forms well-known in the art.

Unit 34 also drives at the same rate (5 cycles per second), a two-phase sine wave generator 36. The voltages generated by unit 36 are employed in the circuit including vacuum tube 60, phase 1 being connected across resistance 3 and phase 2 being connected across potentiometer 2, the resistance and potentiometer being connected in series as shown in the drawing. The voltages of the two phases of generator 36 are in quadrature relation i. e., one is displaced 90 degrees in phase with respect to the other. The generator is originally assembled so that phase 1 is nearly in phase with the scanning cycle of antenna 30, 32. Potentiometer 2 permits the addition to phase 1 of a precise amount of the voltage developed in phase 2. The effective phase of the sine wave applied to control anode 1, of double triode vacuum tube 60, is therefore the vector sum of the voltage of phase 1 with a small portion of the voltage of phase 2 added in quadrature therewith. It is obvious that this arrangement provides a precise and convenient means for adjusting the phase of the effective sine wave input to grid 1 of tube 60.

Vacuum tube 60 is a cathode-coupled, phase-inverting amplifier. Direct current grid biases for the grids 1 and 4 of this amplifier are derived from the voltage divider consisting of resistance 4, potentiometers 5 and 6, and resistances 7, 18 and 19.

In accordance with common practice for electronic control circuits requiring relatively high voltages the mid-point of the voltage supply is grounded so that the effective voltage to ground from the points of highest voltage is cut in half. Because of this we find at terminal 64 a positive voltage of 300 volts and at terminal 66 a negative voltage of 300 volts. The operation of the overall circuit, however, is obviously substantially that which would obtain, were a 600-volt source employed. The negative terminal of the 300-volt source connected to terminal 64 (for normal operation) is of course grounded, as is also the positive terminal of the 300-volt source connected to terminal 66 (for normal operation). This arrangement of voltages also obviously reduces the effects of distributed capacity to ground throughout the circuit.

The double triode vacuum tube 60 functions as an amplifier to increase the amplitude of the input sine wave to the desired level. Also since the cathode resistor 8 which is common to both halves of tube 60 is not by-passed, the cathode voltage in likewise a sine wave which is in phase with the wave introduced at control anode 1. Therefore at the output terminals of plates 2 and 5, two sine waves are produced which are of equal amplitude but displaced in phase by 180 degrees from each other. As is well-known to those skilled in the art, this type of balanced sweep wave contributes substantially to the maintenance of fidelity of focus of the ray over the entire sweep. The direct current level at which the output sweep waves operate is controlled by the sweep bias potentiometer 5, which adjusts the grid bias of both control anodes 1 and 4 of tube 60. To insure that both output waves operate at the same direct current level, the sweep centering potentiometer 6 provides an additional independent means for adjusting the bias on control anode 4 of tube 60.

Capacitors 21, 22 and 23 reduce the distortion of the five-cycle sine wave which might result from the introduction of extraneous higher frequencies, for example, by cross-talk with other circuits of the radar system or with other electrical circuits in the vicinity.

The two five-cycle bearing-sweep voltages are applied to the control anodes 1 and 4, respectively, of the cathode-follower double-triode vacuum tube 62. The output voltages from this tube are of course taken from the cathodes 3 and 6 of tube 62 and are applied to the horizontal deflecting plates 50 of the cathode ray oscilloscope 46. The cathode-follower stage is employed for the usual purpose of providing a low-impedance output and permits the use of low impedance cables to connect to the oscilloscope. A number of oscilloscopes can be operated in parallel from this source of bearing sweep voltage and can be distributed as desired, at numerous observation points some of which are usually remotely located with respect to the radar system.

Resistors 9 and 10 serve to isolate their respective anodes 5 and 2 from each other and contribute the varying voltage drops which duplicate the wave impressed upon control anode 1 of tube 60.

Range sweep generator 44, actuated by pulse energy from pulse transmitter 40, is connected to vertical deflecting plates 52 of oscilloscope 46 and serves to deflect the ray vertically after each transmitted pulse so that the indication corresponding to any particular received reflected pulse will appear at a vertical distance from the base line of the oscilloscope screen corresponding to the distance of the object from which the reflection is received.

Numerous other circuits embodying the principles of the invention can be readily devised by those skilled in the art without departing from the spirit of the invention, the scope of which is defined in the following claims.

What is claimed is:

1. A bearing sweep generator circuit for use in radar systems of the type which scan an area with a beam antenna said circuit comprising a two-phase sine wave generator driven in synchronism with the scanning motion of the radar system beam antenna, the phases of said sine wave generator being in quadrature relation, a double triode vacuum tube amplifier of the cathode-coupled phase-inverting type having an input control electrode and means for impressing on said last stated control electrode the full voltage of one phase of said sine wave generator in series with a selected adjustable portion only of the voltage of said other phase of said generator whereby a pair of balanced sweep voltage waves synchronized with the scanning motion of the radar antenna and subject to convenient precisely adjustable phase alignment with said scanning motion can be obtained.

2. In a radar system which includes a recurrently scanning beam antenna, means for producing a sweep wave voltage in phase with the scanning motion of said antenna which comprises means for generating two voltage waves in quadrature relation having definite phase relations with respect to the scanning motion of said antenna and means for combining one of said voltage waves with a controlled amount of the other of said voltage waves to provide a third voltage wave the phase of which can be precisely adjusted to an in phase relation with the scanning motion of said antenna.

3. Means for producing a voltage wave which can be precisely adjusted to an in phase relation with a recurrently scanning mechanism which comprises means for generating two voltage waves having a substantial phase difference between them, means for driving said generating means in synchronism with said scanning mechanism and means for combining one of said two voltage waves with a controllable portion of the other of said two voltage waves to obtain a third voltage wave which is precisely in phase with the motion of said scanning mechanism.

WILLIAM H. DOHERTY.

REFERENCES CITED

The following references are of record in the file of this patent:

UNITED STATES PATENTS

| Number | Name | Date |
| --- | --- | --- |
| 2,150,265 | Conover | Mar. 14, 1939 |
| 2,421,747 | Engelhardt | June 10, 1947 |
| 2,427,905 | Fyler | Sept. 23, 1947 |